(12) United States Patent
Matheny

(10) Patent No.: US 7,730,660 B2
(45) Date of Patent: Jun. 8, 2010

(54) COMPACT FISHING DEVICE

(76) Inventor: Jack W. Matheny, 7328 Howard Cir., Jonesboro, GA (US) 30236

( * ) Notice: Subject to any disclaimer, the term of this patent is extended or adjusted under 35 U.S.C. 154(b) by 355 days.

(21) Appl. No.: 11/823,383

(22) Filed: Jun. 27, 2007

(65) Prior Publication Data
US 2008/0000135 A1 Jan. 3, 2008

Related U.S. Application Data

(60) Provisional application No. 60/817,291, filed on Jun. 29, 2006.

(51) Int. Cl.
A01K 91/00 (2006.01)

(52) U.S. Cl. .............. 43/43.11; 43/4.5; 43/15; 43/57.1; 43/43.1

(58) Field of Classification Search .............. 43/27.4, 43/4.5, 21.2, 15, 16, 43.1, 57.1, 54.1, 43.11, 43/42.74, 18.1 R, 4; 135/118; 248/156; 52/155, 160, 162–164; 119/786, 787
See application file for complete search history.

(56) References Cited

U.S. PATENT DOCUMENTS

| 118,772 | A | * | 9/1871 | Camp | 43/44.98 |
|---|---|---|---|---|---|
| 488,874 | A | * | 12/1892 | Deniston | 43/27.4 |
| 1,729,646 | A | * | 10/1929 | McCurley | 43/16 |
| 2,612,303 | A | * | 9/1952 | Butler | 224/103 |
| 2,644,263 | A | | 7/1953 | Allen | |
| 2,647,718 | A | * | 8/1953 | Disera | 248/508 |
| 3,732,878 | A | * | 5/1973 | Blankemeyer et al. | 135/118 |
| 4,308,683 | A | * | 1/1982 | Lee | 43/96 |
| 4,332,099 | A | | 6/1982 | Morehead | |
| 4,479,628 | A | * | 10/1984 | Albright | 248/530 |
| 4,803,797 | A | * | 2/1989 | Barham | 43/18.1 R |
| 6,813,856 | B1 | * | 11/2004 | Sitkewicz et al. | 43/42.15 |
| 6,862,838 | B1 | * | 3/2005 | Gibbs | 43/44.98 |
| 2007/0234910 | A1 | * | 10/2007 | Bohr | 101/115 |

* cited by examiner

Primary Examiner—Kimberly S Smith
Assistant Examiner—Joshua J Michener
(74) Attorney, Agent, or Firm—James Ray & Assoc

(57) ABSTRACT

A fishing device includes an elongated stake having a first end and an opposed second end, a ground engaging portion formed adjacent the first end thereof, a through aperture formed adjacent the opposed second end, and a planar surface portion terminating the second end and being disposed perpendicular to a longitudinal axis of the stake. A ring is movably received within the aperture and a first swivel is secured to the ring. A fishing line has one end thereof being secured to the first swivel while a second swivel is secured to a distal end of the fishing line. Fishing implements are attached to one of the distal end of the fishing line, the second swivel and a combination thereof. The user simply casts the fishing line into the water and drives the stake in the ground for unattended fishing.

7 Claims, 2 Drawing Sheets

COMPACT FISHING DEVICE

CROSS-REFERENCE TO RELATED APPLICATIONS

This application is related to and claims priority from U.S. Provisional Patent Application Ser. No. 60/817,291 filed on Jun. 29, 2006.

FIELD OF THE INVENTION

The present invention relates, in general, to fishing devices and, more particularly, this invention relates to a compact fishing device which employs fishing line being attached to one end of a ground engaging stake thus providing users with simple means for catching fish in unattended manner.

BACKGROUND OF THE INVENTION

As is generally well known, fisherman employ a conventional fishing rod having a fishing line with fishing implements attached to one end thereof. The angler casts the fishing line into the water and holds the rod until the fish bites. One problem that is continuously experienced with holding the rod is in that the angler waists time until the fish bites and is unable to attend to other activities. And it may take a long period of time, sometimes hours, to catch a large fish, such as catfish.

Prior to the present invention efforts have been made to alleviate the problem of holding the fishing rod. U.S. Pat. No. 4,332,099 issued to Morehead is a representative teaching of the devices for supporting an unattended fishing rod while fishing. Typically, these devices include a holder which is insertable into the ground and which supports the fishing rod handle. While enabling unattended fishing, these devices do not alleviate other problems which are related to size and cost of the fishing rod. There are many who carry fishing rods, tackle boxes and other fishing equipment for long distances in order to arrive at a preselected fishing location and are burdened with the size and weight of the fishing rods. Others often go camping and would prefer fishing activities without being burdened by the size of the fishing rods. Yet others, who train in survivalist methods, benefit from having compact fishing devices to provide for food source near rivers or lakes.

It is further generally known that owning multiple fishing rods is cost prohibitive to many particularly since rods and reels break during use.

SUMMARY OF THE INVENTION

The invention provides a compact fishing device. The device includes an elongated stake having a first end and an opposed second end. A ground engaging portion is formed adjacent the first end of the stake. A through aperture is formed adjacent the opposed second end of the stake. A planar surface portion terminates the second end and is disposed perpendicular to a longitudinal axis of the stake. A ring is movably received within the aperture. A first swivel is secured to the ring. A fishing line has one end thereof being secured to the first swivel. A second swivel is secured to a distal end of the fishing line. Fishing implements are attached to one of the distal end of the fishing line, the second swivel and a combination thereof. The user simply casts the fishing line into the water, positions the stake at a predetermined position from the body of water and applies force to the second end of the stake first to penetrate the ground surface and then to drive the stake in the ground for unattended fishing.

OBJECTS OF THE INVENTION

It is, therefore, one of the primary objects of the present invention to provide a compact fishing device.

Another object of the present invention is to provide a compact fishing device which employs a ground engaging stake, a fishing line connected to one end of the stake and fishing implements attached to a free end of the fishing line.

Yet another object of the present invention is to provide a compact fishing device which enables unattended fishing.

A further object of the present invention is to provide a compact fishing device which is economical to manufacture.

Yet a further object of the present invention is to provide a compact fishing device which is simple to use.

An additional object of the present invention is to provide a compact fishing device which can be easily transported in a backpack or a glove compartment of a vehicle.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
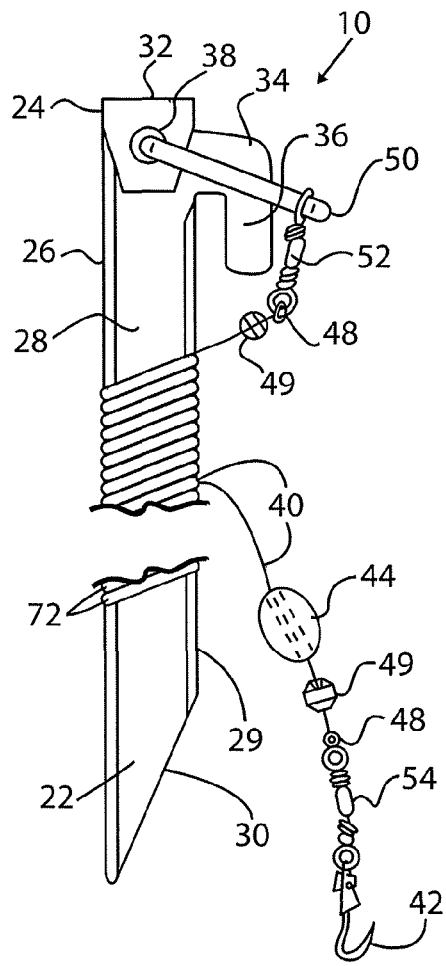
FIG. 1 is a side elevation view of the compact fishing device of the present invention.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
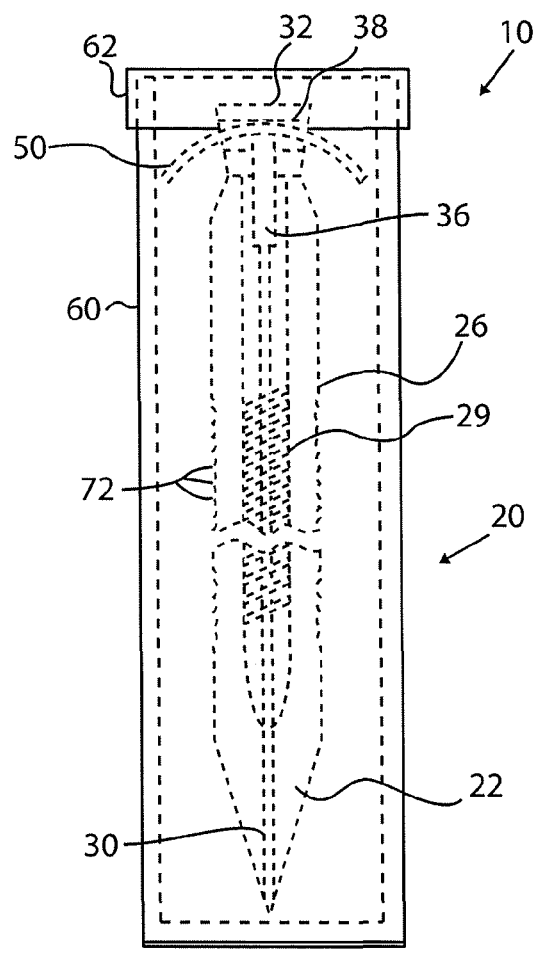
FIG. 2 is a side front elevation view of the compact fishing device of FIG. 1, particularly illustrating the stake member.
Figure 3:
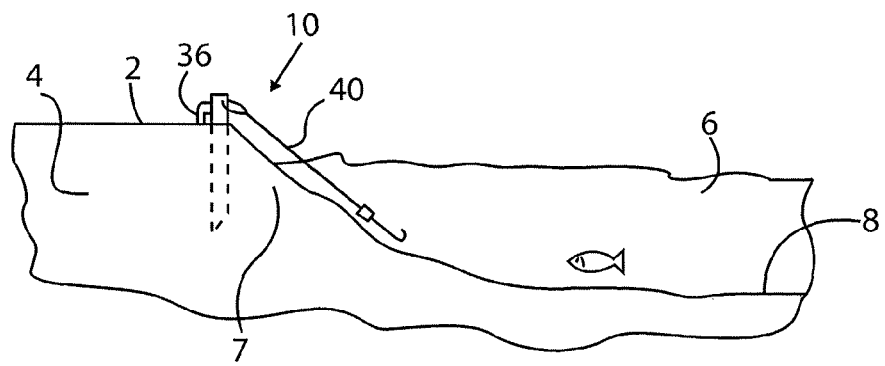
FIG. 3 is a schematic diagram illustrating use of the compact fishing device of FIG. 1.
Figure 4:
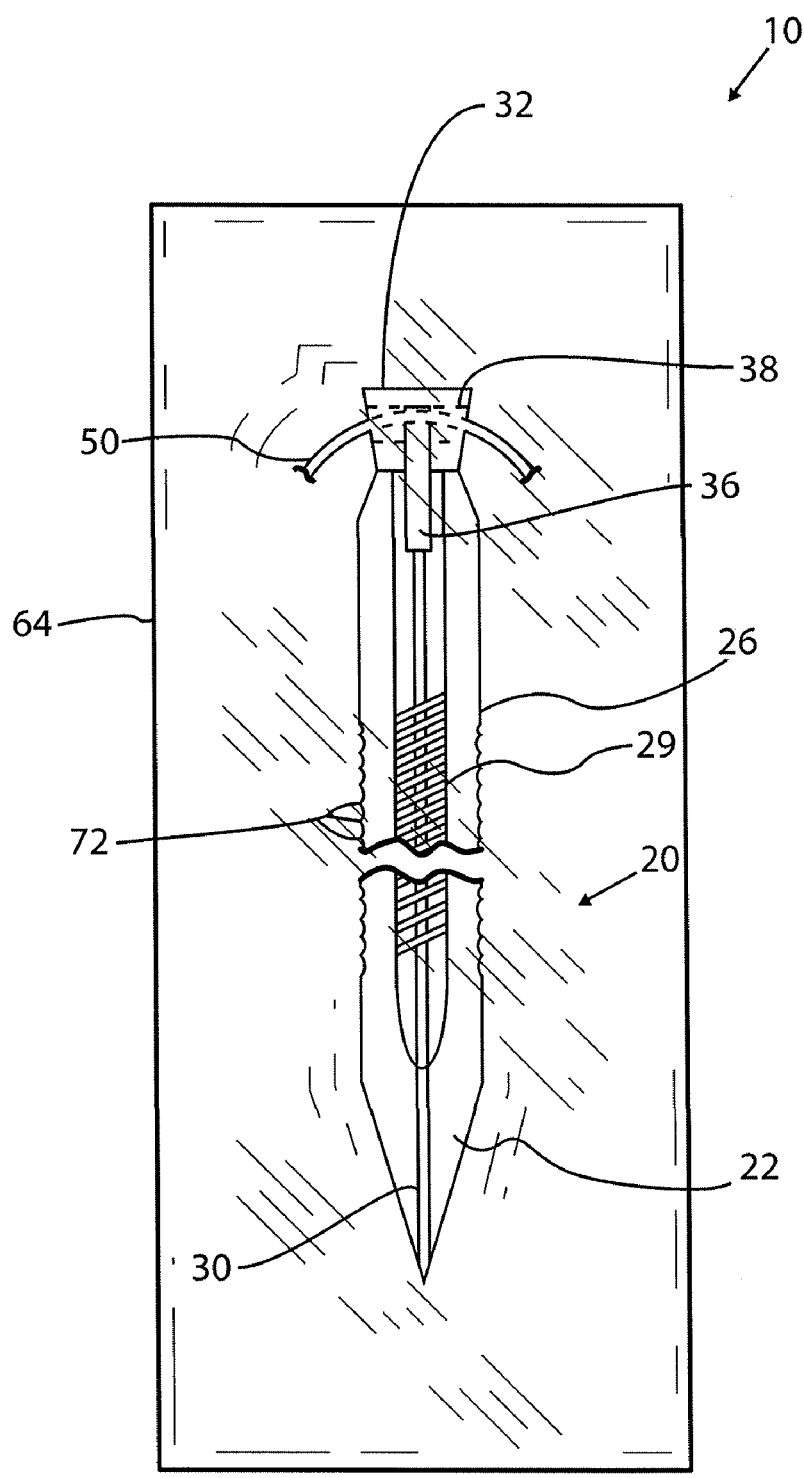
FIG. 4 is a front elevation view of the device enclosed in a flexible sleeve.

Reference is now made, to FIGS. 1-4, wherein there is shown a fishing device, generally designated 10, which includes an elongated stake, generally designated as 20. The stake 20 has a first end 22 and an opposed second end 24. The stake 20 is illustrated as having a T-shaped cross-section formed by members 26 and 28 which extend intermediate the first and second ends 22 and 24 respectively. The stake 20 may further include a longitudinal flange 29 secured to and disposed on the member 28 for added rigidity. While the T-shaped cross-section of the stake 20 is illustrated in FIGS. 1 and 2, it is within the present invention to employ any other cross-sectional shapes of the ground engaging stake. A grounds engaging portion having taper 30 is formed adjacent the first end 22. Such ground engaging portion 30 is capable of piercing a ground surface 2 and enables further penetration of the stake 20 into a ground 4 upon application of force to the second end 24. It is presently preferred for the stake 20 to be formed as a unitary member from a rigid engineered plastic such as ABS or nylon that can absorb the applied force to drive the stake 20 into the ground 4. The rigid engineered plastic material is also advantageous to provide for light weight of the device 10. However, other materials such as fiber, wood, metal and any combinations thereof would be suitable for use with the device 10 of the present invention.

In order to facilitate driving of the stake 20 into the ground, the stake 20 may include an optional planar surface portion 32 which terminates the second end 24 and which is disposed perpendicular to a longitudinal axis of the stake 20. Furthermore, the stake 20 may be adapted with means being secured to and disposed on the second end 24 for limiting the penetration of the stake 20 into the ground 4. By way of an example only in FIGS. 1 and 2, such means may include an L-shaped member which has a first leg 34 thereof disposed integral with the second end 24 of the stake 20 and having a second leg 36 thereof being oriented toward the first end 22 of the stake 20. The length of the second leg 36 enables the user to limit the insertion of the stake 20 into the ground 4. Such L-shaped member, which is essentially a hook, is also advantageous for temporarily hooking the device 10 onto a relatively thin member, for example such as a wall of the tackle box (not shown) or a pocket (not shown) formed on an article of clothing (not shown). It is presently preferred to manufacture the L-shaped member in combination with the stake 20 as a unitary member by a molding process.

A fishing line 40 has one end thereof connected to the second end 24 of the stake 20. Also, fishing implements such as hook 42 and sinker 44 are connected to a distal end of the fishing line 40. The hook 42 may be further attached by way of a clip 46. Furthermore, when a sinker 42 is sized to position the hook 42 at the bottom surface 8 of the body of water 6, a bumper 49 made from plastic or rubber material is inserted between the sinker 44 and the tied end of the line 40 to protect the tied knot 48 from the impact force of the sinker 42 during casting. For example, such bumper 49 may be a well known faceted bead. A second bumper 49 may be poisoned adjacent the first swivel 52.

While the fishing line 40 may be connected to the second end 24 in any well known manner, it is presently preferred for the stake 20 to include a through aperture 38 formed adjacent the opposed second end 24, a ring 50 which is movably received within the aperture 38 and which is sized to enable removal of the stake 20 from the ground 4 and to secure one end of the fishing line 40 to the ring 50. The presently preferred diameter of the ring 50 is about 2.0 inches, although other diameters may be employed in the present invention. The presently preferred material of the ring 50 is metal.

In applications, wherein it is desirable to reduce tension acting onto the fishing line 40, a first swivel 52 is secured to the ring 50 and one end of the fishing line 40 is then secured to the first swivel 52.

It is within the scope of the present invention to provide a second swivel 54 which is secured to a distal end of the fishing line 40 and to attach the fishing implements 42, 44 onto the second swivel 54. Preferably, the first swivel 52 and the second swivel 54 are identical.

It will be appreciated that simple tied knot 48 is advantageous for connecting the line 40 to the stake 20, to the ring 50, to the first swivel 52 or to the second swivel 54.

The present invention further contemplates a packaging means 60 for conveniently transporting or storing the device 10. Such packaging means may include one of a flexible sleeve 64 which is sealed at both the first and second end thereof after receiving the device 10 and a cylindrical container having one open end and a lid 62 for selectively closing and opening the open end. It will be understood that the packaging means 60 may be sized to contain any selected quantity of the devices 10. Furthermore, a plurality of packaging means 60 may be formed together into a unitary member for carrying such selected quantity of the device 10 being individually packed.

When it is advantageous to store and transport the device 10 with the fishing line 40 being coiled around the stake 20, such device 10 may be adapted with optional spiral groove 72 formed on the stake 20 and sized to receive the fishing line 40.

The presently preferred length of the stake 20 is about 9.0 inches which has been found advantageous to drive the device 10 into the ground 4 and provide sufficient support for the fishing line 40 during use while enabling the device 10 to easily and simply fit into the pocket of the article of clothing (not shown), tackle box (not shown), tool box (not shown), glove compartment of a vehicle (not shown), back pack (not shown) and like confinements generally related to various leisure, hiking, survivalist training and the like activities. The presently preferred length of the fishing line 40 is about 15.0 feet.

It will be appreciated that after the fishing line 40 and various fishing implements 42, 44 and 49 are attached to the stake 20, the user simply casts the fishing line 40, best by grabbing the sinker 42 and throwing it into the body of water 6, positions the first end 22 in abutting relationship with the ground surface 2 while forming a predetermined tension in the fishing line 40, applies force to the second end 24 first penetrating the ground surface 2 and then driving the stake 20 into the ground 4. When the stake 20 is secured within the ground 4, the user is able to leave the position of the device 10 to attend to other activities or matters. For example, the user can employ a plurality of devices 10 according to the aforedescribed method periodically inspecting each fishing line 40 for the signs of caught fish while attending to other activities such as setting up shelter, gathering firewood or simply relaxing.

It will be also understood that the costs to manufacture device 10 of the present invention will be significantly less than the cost of the traditional fishing rod (not shown). Furthermore, the user is not burdened by the expense of maintaining the traditional fishing rod (not shown) in the event of the fishing reel (not shown) failure.

Furthermore, use of the pluralities of the device 10 by a single user provides for even greater cost savings of owning and maintaining fishing devices when compared with an identical plurality of the traditional fishing rods (not shown).

Although the present invention has been shown in terms of the device 10 for catching a bottom feeding fish, such as catfish, it will be apparent to those skilled in the art, that the present invention may be adapted with a well known bobber for suspending the hook at a predetermined depth below the surface of water.

The device 10 is used on the bank 7 of the body of water 6 and alleviates the problems associated with use of what is known as a trout line which is disclosed in U.S. Pat. No. 2,644,263 issued to Allen by. By being casted from a single bank, the device 10 enables the user to fish during either day or night and does not require special permits or tags.

Furthermore, a well known fishing bell may be connected to the ring 50 and or the first swivel 52 to annunciate caught fish pulling onto the fishing line 40.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A fishing device, said device comprising:
   (a) an elongated stake having a first end, an opposed second end, a first longitudinal member connecting said first and second ends, a second longitudinal member having one edge thereof disposed centrally on an inner surface of said first longitudinal member, said second longitudinal member extending in a plane transverse to a plane of said first longitudinal member and forming a T-shaped cross-section of said elongated stake, a taper formed in each of said first and said second longitudinal members adjacent said first end of said elongated stake, a through aperture formed adjacent said opposed second end, and a planar surface portion terminating said second end and being disposed perpendicular to a longitudinal axis of said stake;
   (b) a ring passed through an entire length of said aperture;
   (c) a first swivel which is secured to said ring;
   (d) a fishing line having one end thereof secured to said first swivel;
   (e) a second swivel which is secured to a distal end of said fishing line;
   (f) fishing implements attached to one of said distal end of said fishing line, said second swivel and a combination thereof; and
   (g) a longitudinal flange disposed on an opposed edge of said second longitudinal member in a plane generally parallel to said plane of said first longitudinal member, wherein one end of said longitudinal flange terminates at a beginning of taper formed in said second elongated member;
   (h) a spiral groove formed on said elongated stake for coiling said fishing line thereon; and
   (i) an L-shaped member having one leg thereof disposed integral with said second end of said stake in a plane transverse to said longitudinal axis thereof and having a second leg thereof being oriented toward said first end of said stake; and wherein said fishing implements include a hook secured to said second swivel and a weight means for positioning said hook in abutting relationship with a bottom surface of a body of water.

2. The device, according to claim 1, wherein said device further includes a packaging means for enclosing and conveniently transporting said device.

3. The device, according to claim 2, wherein said packaging means includes one of a flexible sleeve which is closed at both end thereof after receiving said device and a cylindrical container having a closed first end, an open second end and a lid for selectively closing and opening said second open end.

4. A method of fishing comprising the steps of:
   (a) providing the fishing device of claim 1;
   (b) casting said distal end of said fishing line having said fishing implements attached thereto into a body of water;
   (c) positioning said first end of said stake in abutting relationship with a ground surface;
   (d) applying force to said second end of said stake;
   (e) piercing with said taper of said stake said ground surface; and
   (f) driving said stake into said ground.

5. The method, according to claim 4, wherein said method includes an additional step of leaving, by a user, a position having said stake driven into said ground.

6. The method, according to claim 5, wherein said method includes an additional step of inspecting, at predetermined time intervals, said fishing line for signs of a fish bite.

7. The method, according to claim 4, wherein said method includes an additional step of limiting, by way of said one leg of said L-shaped member disposed on said second end of said elongated stake, penetration of said stake into said ground.

\* \* \* \* \*